(12) United States Patent
Guntaka et al.

(10) Patent No.: US 10,234,677 B1
(45) Date of Patent: Mar. 19, 2019

(54) LIGHT STEERING STRUCTURES FOR ELECTROWETTING DISPLAYS

(71) Applicant: Amazon Technologies, Inc., Seattle, WA (US)

(72) Inventors: Tulasi Sridhar Reddy Guntaka, Eindhoven (NL); Karel Johannes Gerhardus Hinnen, Eindhoven (NL)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/084,642

(22) Filed: Mar. 30, 2016

(51) Int. Cl.
G02B 26/00 (2006.01)
G02B 26/08 (2006.01)
G02F 1/29 (2006.01)
G02B 5/00 (2006.01)

(52) U.S. Cl.
CPC .......... *G02B 26/005* (2013.01); *G02B 5/003* (2013.01)

(58) Field of Classification Search
CPC .... G02B 26/005; G02B 26/004; G02B 26/02; G02B 2207/115; G02B 5/201; G02B 26/007; G02B 26/04; G02B 27/4233; G02B 3/14; G02B 5/0226
USPC ............... 359/237, 242, 265–267, 270–273, 359/290–292, 296, 298, 315, 321, 322
See application file for complete search history.

(56) References Cited

U.S. PATENT DOCUMENTS 9,529,189 B1 * 12/2016 Langendijk .......... G02B 26/005

\* cited by examiner

Primary Examiner — Brandi Thomas
(74) Attorney, Agent, or Firm — EIP US LLP (57) ABSTRACT

An electrowetting display device includes light steering structures that direct incoming light away from pixel walls. According to some configurations, transparent or semi-transparent pixel walls are shielded from incoming light by a black matrix (BM) material in a color filter plate and by the light steering structures. Instead of the incoming light being completely blocked by the black matrix, at least a portion of the incoming light that would have been blocked by the black matrix is directed by one or more of the light steering structures to an area of the pixel such that the brightness of the pixel is increased.

16 Claims, 8 Drawing Sheets

LIGHT STEERING STRUCTURES FOR ELECTROWETTING DISPLAYS

BACKGROUND

An electrowetting display includes an array of pixels individually bordered by pixel walls that retain liquid, such as opaque oil. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples. In some displays, pixel walls may be substantially transparent so as to transmit a wide portion of the visible part of the electromagnetic (EM) spectrum. Such transmission may allow light to pass through pixel walls from one pixel to adjacent pixels. Generally, adjacent pixels correspond to colors that are different from one another (e.g., a red pixel adjacent to a blue pixel adjacent to a green pixel, and so on). Light reflected from the bottom of a pixel increases the black level and hence reduces contrast. Light transmitted through pixel walls and over the pixel walls may contribute to photo crosstalk between the adjacent pixels. In some cases, a black matrix (BM) is placed above the pixel walls to block incoming light from reaching the underlying pixel wall. While the BM can increase contrast for a display, the BM can reduce the brightness of the display.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In various examples described herein, electronic devices include electrowetting displays for presenting content and other information. The electrowetting displays include light steering structures for directing incoming light, such as ambient light, away from pixel walls. According to some configurations, transparent or semi-transparent pixel walls are shielded from incoming light by a black matrix (BM) material in a color filter plate and by the light steering structures. Generally, placing the black matrix material above the pixel walls blocks incoming light from above the pixel walls and reduces display brightness by not allowing the incoming light to reach a reflector plane of the electrowetting display. According to examples presented herein, light steering structures (LSSs) located above the black matrix direct the incoming light away from the black matrix and the underlying pixel wall. Instead of the incoming light being completely blocked by the black matrix, at least a portion of the incoming light that would have been blocked by the black matrix is directed to an area of the pixel such that the brightness of the pixel is increased.

In some configurations, the LSSs are part of a light guide (LG) that is located above the color filter that includes the black matrix material. The LSSs are located within the LG such that the LSSs align with the black matrix material. In contrast to a traditional LG that includes light extraction features intended to serve as a part of LG design for evenly distributing light through the display, in some examples, the LG includes LSSs to direct incoming light away from the pixel walls in addition to including other LSSs for evenly distributing light across the surface of the display.

Generally, a LSS can include microstructures that control the direction of the incoming light. The microstructures can be micro-lenses or lenslets, grating elements, or the like. The LSSs can be formed using different techniques. For example, the LSSs may be imprinted (e.g., by embossing) on the layer of lacquer and UV-cured. In other examples, an injection molding process can be used to form the LSSs.

In some configurations, the LSSs that are placed above the pixel walls include arrays of micro-lenses with a variety of shapes to direct the incoming light away from the pixel walls. When the LSSs, used to direct light away from the pixel walls, are part of the LG, other LSSs including different micro-lenses can be included within the LG (e.g., adjacent to the LSSs used to direct light away from the pixel walls) to evenly distribute light from one or more light sources (e.g., a front light or a backlight) across the display. In this configuration, there are two different types of LSSs. A first type of light steering structure to direct light away from the pixel walls and a second type of light steering structure to evenly distribute light generated by a light of the display evenly across the display. In some examples, the LSSs used to direct light away from the pixel walls may be placed in a separate layer from the LG. For instance, the LSSs used to direct light away from the pixel walls may be placed in a layer above or below the light guide.

Steering the incoming light towards a display reflector plane using the LSSs can increase the effective aperture of a pixel. As such, the brightness of the display is increased. Further, since the incoming light is steered away from the BM, thin film transistors (TFTs) that may be located near or underneath a pixel wall can be protected since there is less light reaching a TFT. The contrast of the display can also be increased since more light can be steered into the pixel.

In some configurations, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various examples described include techniques for assembling electronic devices including these components for the electrowetting displays and other features described herein.

Figure 1:
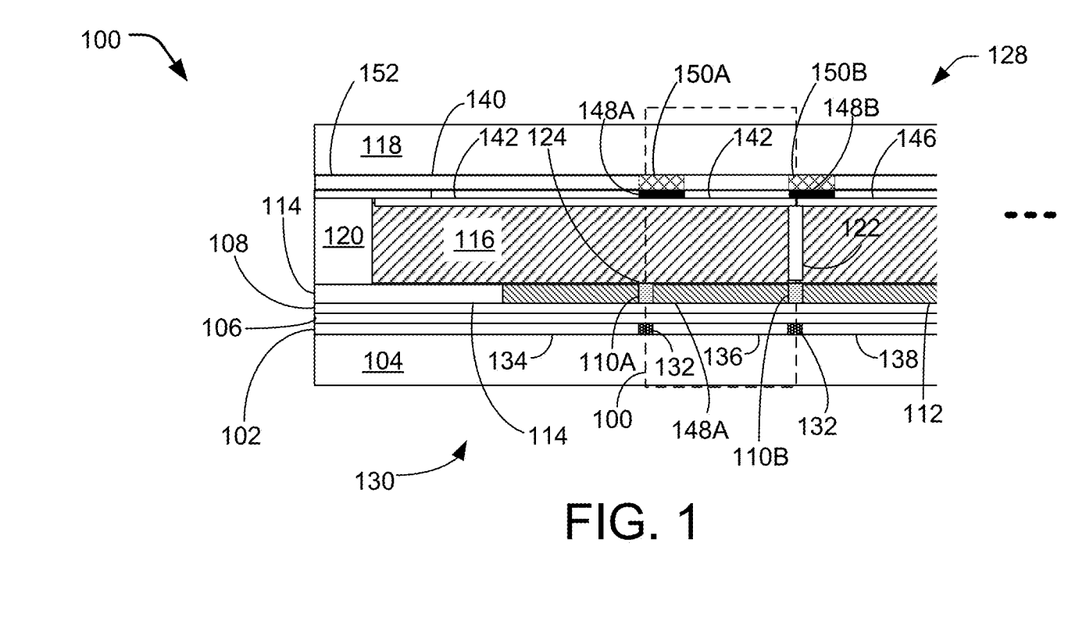
FIG. 1 is a cross-section of a portion of a reflective electrowetting display device illustrating several electrowetting pixels including light steering structures, according to some examples.

FIG. 1 is a cross-section of a portion of a reflective electrowetting display device illustrating several electrowetting pixels 100 including light steering structures, according to some examples. Though three such electrowetting pixels are illustrated, an electrowetting display device may include any number (usually a very large number, such as thousands or millions) of electrowetting pixels. An electrode layer 102 is formed on a first (e.g., bottom) support plate 104 and may comprise one or more individual electrodes in each electrowetting pixel.

In various examples, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over or on a supporting (but non-conducting) substrate, which may be glass or any of a number of other transparent or non-transparent materials, for example.

In some implementations, a barrier layer 106 may separate electrode layer 102 from a hydrophobic layer 108 also formed on first support plate 104. In some implementations, hydrophobic layer 108 may comprise any of a number of types of fluoropolymers, such as AF1600®, produced by DuPont, based in Wilmington, Del. Hydrophobic layer 108 may also be any of a number of water-repelling materials that affect wettability of an adjacent material, for example.

Pixel wall 110A and pixel wall 110B, collectively referred to as "110", form a patterned electrowetting pixel grid on or above hydrophobic layer 108. Pixel walls 110 may comprise one or more photoresist materials such as, for example, epoxy-based negative photoresist SU-8. In some examples, the pixel walls 110 are clear or at least partially transparent.

As illustrated in FIG. 1, a light steering structure 150A is located above pixel wall 110A and a light steering structure 150B is located above the pixel wall 110B. According to some configurations, a light steering structure 150 is located above each pixel wall and/or black matrix. In the current example, the light steering structures 150 are located above a black matrix material 148 that blocks a corresponding pixel wall from incoming light. The black matrix material 148 is a material that is black in color and is directed at preventing light leakage between the pixel regions. One or more pixel walls can be associated with a pixel region. For example, a single pixel wall can enclose a pixel region and/or two or more pixel walls can be formed to enclose a pixel region. According to some configurations, the black matrix material 148A is part of a color filter layer that includes a color filter above each pixel region.

Figure 2:
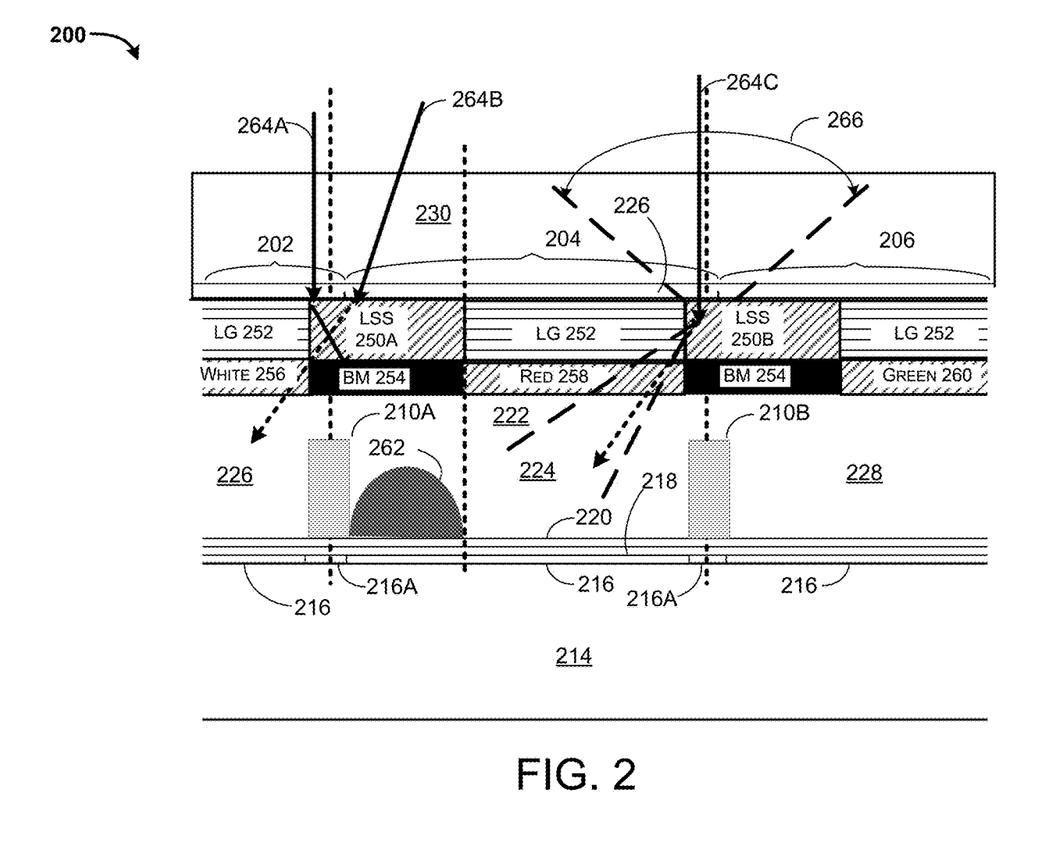
FIG. 2 illustrates a cross-section view of electrowetting pixels, including light steering structures, according to some examples.

In some examples, the black matrix 148A and the light steering structure 150A extends from the pixel wall 110A bordering the pixel region 100 toward an opposing pixel wall 110B of the pixel region 100. According to some configurations, the black matrix 148A and the light steering structure 150A extend a distance to cover a first fluid 112 when the pixel 100 is in the on state (e.g., the first fluid moves toward the pixel wall 110A forming a "droplet" type shape as illustrated in FIG. 2). In other examples, the black matrix 148A and the light steering structure 150A may be other lengths (e.g., the width of the underling pixel wall, a width up to and a little past the width of the droplet when the pixel 100 is in the on state). In some other examples, the black matrix 148 may not be included. For instance, the light steering structures 150 are placed at a location above the pixel walls such that incoming light does not directly hit the pixel walls 110.

The patterned electrowetting pixel grid comprises rows and columns that form an array of electrowetting pixels. For example, an electrowetting pixel may have a width and length in a range of about 50 to 500 microns. In some implementations, the pixel walls need not be on the hydrophobic layer. For example, pixel walls may be directly on the electrode layer (not illustrated in FIG. 1).

A first fluid 112, which may have a thickness (e.g., depth, height) in a range of about 1 to 10 microns, for example, overlies hydrophobic layer 108. First fluid 112 is partitioned by pixel walls 110 of the patterned electrowetting pixel grid. An outer rim 114 may comprise the same material as pixel walls 110. A second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored or absorbing. First fluid 112 is non-polar and may for instance be an alkane like hexadecane or (silicone) oil.

A second (e.g., top) support plate 118 covers second fluid 116 and edge seals 120 maintain second fluid 116 over the electrowetting pixel array. Support plate 118 may be supported by edge seals 120 and a spacer grid 122, a portion of which is illustrated in FIG. 1. Spacer grid array 122 may substantially extend over the array of pixels 100. For example, portions of spacer grid 122 may extend from tops 124 of pixel walls 110 to second support plate 118. Spacer grid array 122, black matrix 148, LSSs 150, and pixel walls may be substantially aligned with one another.

The reflective electrowetting display device has a viewing side 128 on which an image formed by the electrowetting display device may be viewed, and a rear side 130. Second support plate 118 faces viewing side 128 and first support plate 104 faces rear side 130. The electrowetting display device may be an active matrix driven display type or a passive matrix driven display, just to name a few examples.

Separation block 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel region. Electrode layer 102 need not extend to edges of the display area of the electrowetting display device, as illustrated in the figure.

In some examples, electrowetting pixels may include a second electrode 140 disposed on second support plate 118, and color filters 142, 144, and 146 over individual pixels. The electrode on the second support plate may or may not be patterned to form any of a number of circuit configurations, for example.

In some examples, color filters of adjacent pixels may have different colors. Thus, for example, color filter 142 may be red, color filter 144 may be green, and color filter 146 may be blue. In such an example, the left-most illustrated pixel may be a red pixel, the middle pixel may be a green pixel, and the right-most illustrated pixel may be a blue pixel. In other configurations, other colors may be included in the color filter (e.g., white).

Hydrophobic layer 108 is arranged on first (e.g., bottom) support plate 104 to create an electrowetting surface area. The hydrophobic character causes first fluid 112 to adhere preferentially to first support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

First fluid 112 absorbs at least a part of the optical spectrum. First fluid 112 may be transmissive for a part of the optical spectrum, forming a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent or colored. A reflective layer may reflect the entire visible EM spectrum, making the layer appear white, or part of it, making it have a color.

If a voltage is applied across electrowetting pixel 100 (e.g., between electrode layer 102 and second electrode 140), electrowetting pixel 100 will enter into an active state. Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action at least partly uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

FIG. 2 illustrates a cross-section view 200 of electrowetting pixels, including light steering structures, according to some examples. In particular, view 200 illustrates a portion of a pixel region 202, a pixel region 204, and a portion of pixel region 206. Pixel region 202 is bordered by a pixel wall 210A and a pixel wall 210B. As illustrated, the pixel walls 210A-210B are transparent or semi-transparent and allow at least a portion of impinging light to pass through the pixel wall. As discussed above, each of the pixel walls 210 within the pixel region are protected from incoming light by a corresponding light steering structure.

An object "having a color" may indicate that the object comprises a material of that color. For example, a colored filter 216 having a color of "red" comprises a material that transmits a particular portion of the optical spectrum corresponding to the color red. Thus, the material may appear to be the color and substantially transmit the color. A pixel or pixel region "having a color" means that the pixel or pixel region is configured to produce the color as a pixelated portion of an image. The pixel or pixel region may be covered by a color filter comprising a material that transmits a particular portion of the optical spectrum corresponding to the color. In other configurations, such a colored filter may be located in another part of the pixel or pixel region (e.g., on a bottom support plate).

Pixel regions 202-206 may be located on a support plate 214, which may be substantially flat, and may include, among other things, a conductive layer 216 (e.g., an electrode layer), a dielectric barrier layer 218, and an AF layer 220 at least partially covering the dielectric barrier layer. The conductive layer, dielectric barrier layer, and the AF layer may be formed or otherwise disposed on support plate 214. For a particular example, dielectric barrier layer 218 may comprise SiN, SiON, SiO, or TaO, just to name a few examples, and may have a thickness in a range from about 100 nanometers up to about 500 nanometers. In some implementations, the dielectric barrier layer may comprise a multilayer structure that includes organic and inorganic sublayers. An organic layer may comprise polyamide, for example. An organic layer may have an insulating property higher than that of an inorganic layer so as to reduce the amount of leakage current between conductive layer 216 and a fluid portion 222, for example.

In some examples, the pixel walls 210 can be disposed directly on AF layer 220. In other examples, pixel walls 210 may be disposed directly on conductive layer 216 or dielectric barrier layer 218. Thickness of conductive layer 216 may be in a range from about 200 nanometers up to about 300 nanometers. In substantially the same plane as conductive layer 216, an insulative material or dielectric material 216A can be located between adjacent portions of conductive layer 216.

Fluid portion 222, which may comprise one or more different fluids that are immiscible with one another, may cover the stack of conductor(s) and dielectric(s) 216, 218, and AF layer 220. In some examples, fluid portion 222 may be considered to include a first portion 224 comprising fluid portion 222 between pixel walls 210 of pixel region 204, include a second portion 226 comprising fluid portion 222 to the left (in the figure) of pixel wall 210A of pixel region 202, and include a third portion 228 comprising fluid portion 222 to the right (in the figure) of pixel wall 210B of pixel region 206, for example.

A top support plate 230 may be located over fluid portion 222, overlaying the structure (e.g., pixel walls, conductive layer, hydrophobic layer, and so on) disposed on bottom support plate 214. A top electrode layer 226, light guide 252 with integrated light steering structures 250A-250B, a white color filter 256 (e.g., clear), a red color filter 258, a green color filter 260, and black matrix 254 may be disposed on top support plate 230. Each color filter may be disposed over individual pixel regions. For example, white color filter 256 may be placed in or over pixel region 202 so that substantially all light entering pixel region 202 travels through the white color filter 256. Similarly, red color filter 258 may be placed in or over pixel region 204 so that substantially all light entering pixel region 204 travels through the red color filter 258, and green color filter 260 may be placed in or over pixel region 206 so that substantially all light entering pixel region 206 travels through the green color filter 260. As discussed briefly above, a black matrix 254 may be placed over a portion of a pixel region.

As illustrated in FIG. 2, the pixel region 204 is in the "on" state as indicated by the electrowetting oil droplet 262 that is formed against the pixel wall 210A. According to some configurations, the BM 254 and the LSS 250A protects (e.g., from incoming light rayes) the portion of the pixel region 204 that includes the width of the electrowetting oil droplet 262 when the pixel is in the on state. In this way, when light rays, such as the light rays 264A-264B, impinge upon the pixel region 204, the light is either prevented from reaching the pixel wall 210A by being blocked by the BM 254 or redirected by the LSS 250A. The BM 254 also helps prevent the oil from being exposed to the incoming light.

In the current example, light ray 264A is blocked by the BM 254, light ray 264B is directed by the LSS 250A through the white color filter 256 in pixel region 202 and right ray 264C is directed by the LSS 250B through the red color filter 258. Generally, light rays entering a cone area 266 are steered by the light steering structures 250B to exit within the pixel region 204 such that the incoming light adds to the brightness of the display. While the LSSs 250 are illustrated within the light guide 252, the LSSs may be located in other layers of the electronic display. For example, another layer (not shown) may be placed above the pixel walls 220 above or below the light guide 252. In other examples, the LSSs 250 may be placed above the pixel walls without an intervening black matrix 254.

Generally, a light guide 252 is designed to transport light from a light source to different points within the display such that the light is distributed evenly. Light guides are usually made of optical grade materials such as acrylic resin, polycarbonate, epoxies, and glass. In some examples, the light guide 252 may comprise a substrate, such as of a transparent thermoplastic (e.g., PMMA (poly(methyl methacrylate)) or other acrylic, polycarbonate, etc.), or glass. As discussed herein, in addition to transporting light from a light source (e.g., a front light) to different points within the display such that the light is distributed evenly, the LG 252 can also include the LSSs 250 to help in blocking the pixel walls from the incoming light while allowing more light to enter the pixel region (e.g., pixel regions 202, 204, 206).

In some cases, the light guide 252 includes LSSs 250 formed on at least one surface of a substrate. In the illustrated example, the LSSs 130 can be formed on a bottom surface of the light guide 252, and are configured to direct light out through the bottom surface of the light guide 252. In other examples, the LSSs 255 can be formed on the top surface of the light guide 252, or on both the bottom surface and the top surface of the light guide 252.

As an example, the LSSs 250 are microstructures that can be formed in a layer of lacquer or other material that function to direct light away from the pixel walls. In some configurations, the LSSs 250 are grating elements configured to distribute the light away from the pixel walls 216 and away from the electrowetting oil droplet 262. To create the LSSs 250, the layer of lacquer can be applied to a substrate of the light guide 252, the LSS elements embossed to the layer of lacquer, and the light guide 252 can be UV-cured. In some instances, the UV-cured lacquer is made of a cross-linked, tri-functional polymer material that co-polymerizes to a plastic solid when exposed to a high-intensity UV light source.

Alternatively, the substrate of the light guide 252 and the LSSs 250 can be manufactured as a single element, such as by an injection molding process. Further, other examples may include other types of light guides and light guiding components, such as those that include refractive elements (e.g., micro-lenses to redirect light from a light source in selected directions).

In other configurations, the LSSs 250 can be other types of microstructures (e.g., grating elements or other types of lenses) that can be imprinted into some type of material (e.g., a polyester film). The microstructures control the direction of the incoming light such that the incoming light is directed away from the pixel walls. In some configurations, the LSSs include arrays of micro-lenses with a variety of shapes to direct the incoming light away from the pixel walls.

In some examples, each of the LSSs 250 may include the same microstructures (e.g., each LSS can be formed using the same pattern). In other examples, the microstructures of the different LSSs (e.g., LSS 250A, and LSS 250B) that direct the incoming light in slightly different directions. For example, LSSs that are located farther from a pixel wall may be formed to direct the light at a less steep angle as compared to LSSs 250 that are closer to a pixel wall. Further, the density of the LSSs 250 can change (e.g., depending on a distance from a light source and/or a distance from a pixel wall).

When the LSSs that direct light away from the pixel walls are part of the light guide, other types of microstructures can also be included in the light guide 252 to evenly distribute light from one or more light sources (e.g., a front light or a backlight) across the display. For example, micro-lenses for distributing light across a display can be imprinted onto a micro-lens film in a position that is adjacent to the LSSs 250 that direct light away from the pixel walls. In some configurations, the microstructures (e.g., micro-lenses) may range between about 10 to 200 µm. The shape of the microstructures can be varied to achieve specific light transmission goals.

Figure 3:
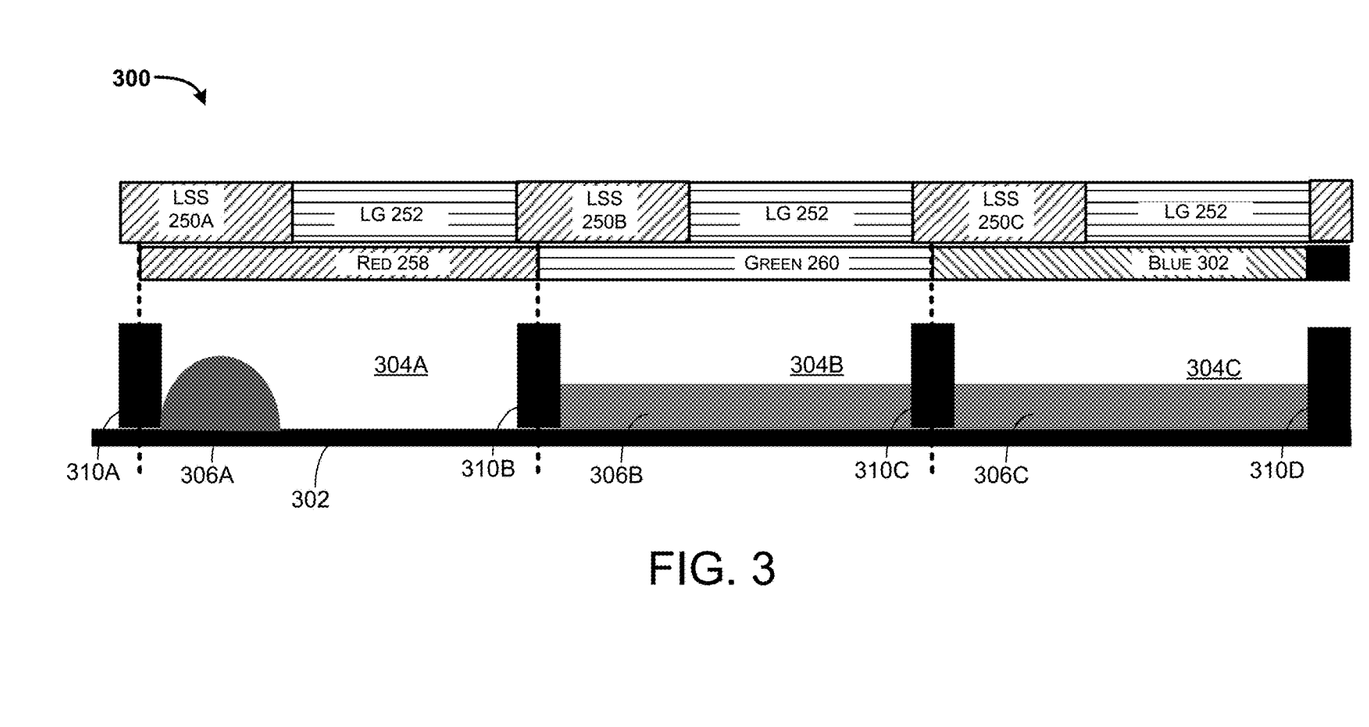
FIG. 3 illustrates a cross-section view of electrowetting pixels, including light steering structures located above solid colored pixel walls, according to some examples.

FIG. 3 illustrates a cross-section view 300 of electrowetting pixels, including light steering structures located above solid colored pixel walls, according to some examples. In particular, view 300 illustrates a pixel region 304A, a pixel region 304B, and a pixel region 304C. Pixel region 304A is bordered by a pixel wall 310A and a pixel wall 310B. Pixel region 304B is bordered by a pixel wall 310B and a pixel wall 310C. Pixel region 304D is bordered by a pixel wall 310C and a pixel wall 310D. As illustrated, the pixel walls 310A-310D are colored black, or some other color such that a majority of impinging light does not pass through.

In the current example of FIG. 3, a black matrix material is not placed between the light steering structure 250 and the pixel walls as illustrated in FIG. 1 and FIG. 2. Instead, a LSS 250 is placed above a corresponding pixel wall 310 such that light is steered away from the pixel wall.

Figure 4:
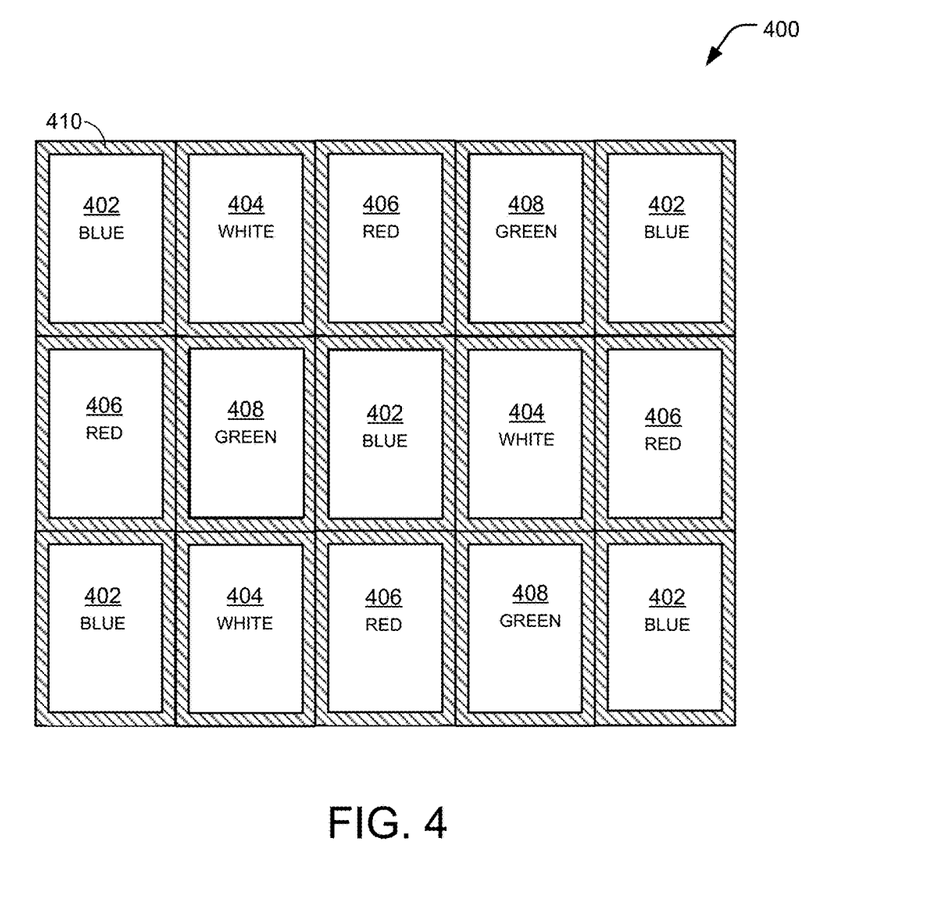
FIG. 4 illustrates a top view of light steering structures above an array of colored electrowetting pixel regions, according to some examples.

FIG. 4 illustrates a top view 400 of light steering structures above an array of colored electrowetting pixel regions, according to some examples. Such an array is merely a portion of a larger array of pixel regions. In this particular example, pixel array includes red (R), green (G), blue (B), and white (W) pixel regions in an RGBW configuration. Of course, array may include any of a number of color configurations, including other colors, and claimed subject matter is not limited in this respect. For example, pixel regions 402 are blue, pixel regions 404 are white, pixel regions 406 are red, and pixel regions 408 are green. Accordingly, blue pixel regions 402 may include a blue color filter, white pixel regions 404 may include a clear (or no) color filter, red pixel regions 406 may include a red color filter, and green pixel regions 408 may include a green color filter, and. Herein, "clear" indicates a substantially transparent material, in contrast to a colored material, such as a red, green, or blue colored material. In the current example, each of the pixel regions is surrounded by light steering structures 410 that are sized to protect the pixel walls and/or electrowetting oil (the first fluid 112). In some configurations, the light steering structures 410 are integrated with a light guide. For example, a single micro lens film can include both the LSS microstructures (to direct the incoming light away from the pixel walls) as well as other microstructures to distribute light from a light source evenly across the display. In other configurations, the light steering structures 410 can be placed on a different layer as compared to a light guide.

Figure 5:
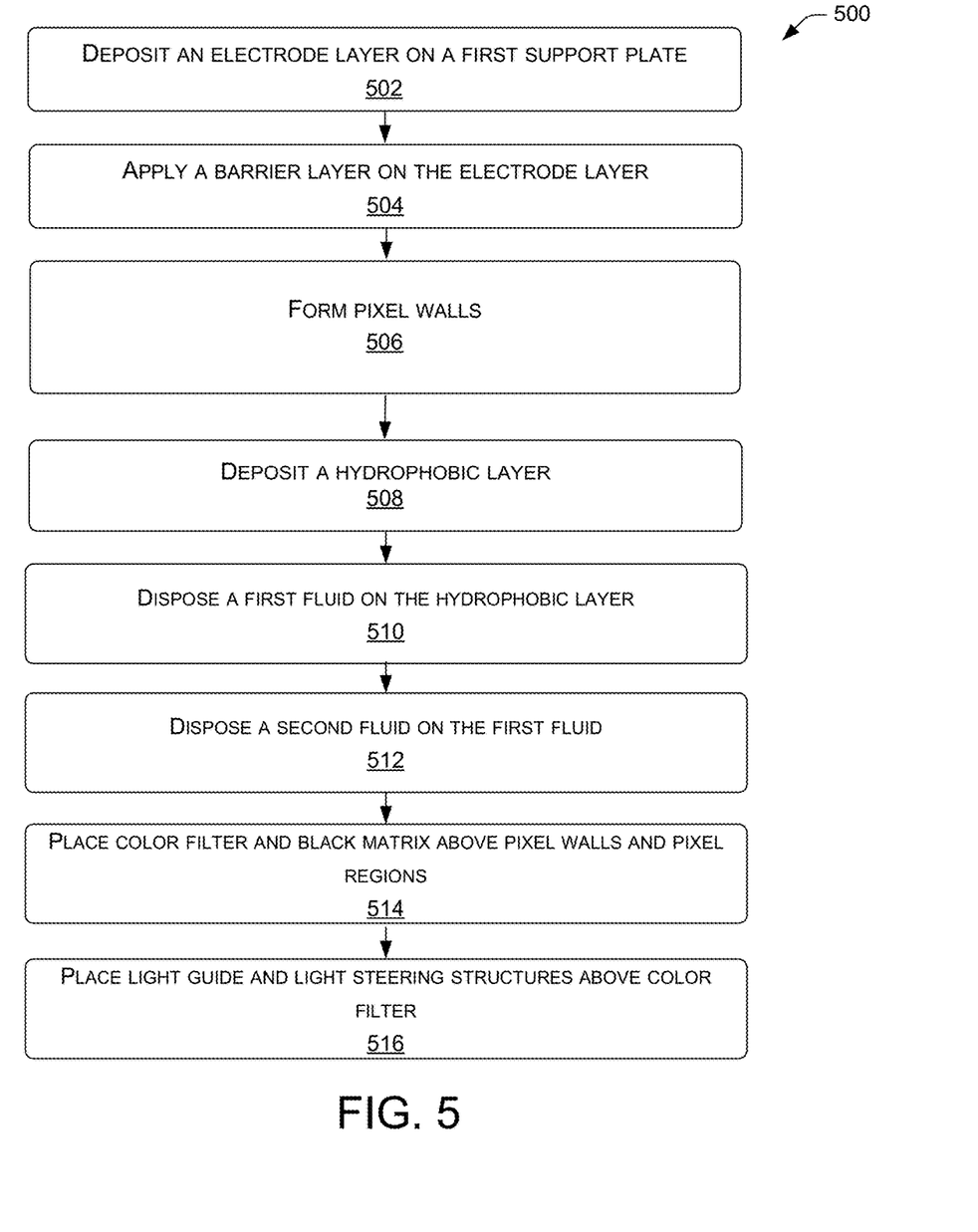
FIG. 5 is a flow diagram of a process for fabricating an electrowetting display device that includes light steering structures for directing light away from pixel walls, according to various examples.

FIG. 5 is a flow diagram of a process 500 for fabricating an electrowetting display device that includes light steering structures for directing light away from pixel walls, according to various examples. For example, the display device may be the same as or similar to the display device illustrated in FIG. 1. Though claimed subject matter is not limited in this respect, process 500 may be performed by a fabricator, such as a person, an apparatus, a person operating an apparatus, or a combination thereof, for example.

At 502, a fabricator may apply, e.g., deposit an electrode layer on a first support plate. For example, such an electrode layer may be the same as or similar to 216 and first support plate may the same as or similar to 214, illustrated in FIG. 2. Application may be performed by CVD, PVD, MBE, or sputtering, just to name a few examples.

At 504, the fabricator may apply e.g., deposit a barrier layer on the electrode layer. The barrier layer, which may be the same as or similar to 218 illustrated in FIG. 2, may comprise an inorganic and/or organic dielectric material.

At 506, the fabricator may form pixel walls 110. The pixel walls 110 can be formed from a photoresist material, which may comprise a negative tone photoresist. The photoresist may comprise SU8 or a JSR photoresist, just to name a few examples. The photoresist material may be applied on the support plate by coating techniques, such as spin coating or slit coating, and so on.

At 508, the fabricator may deposit a hydrophobic layer above the electrode layer. The hydrophobic layer may be applied on the support plate by coating techniques, such as spin coating or slit coating, and so on.

At 510, the fabricator may dispose a first fluid on the hydrophobic layer. As discussed above, a first fluid 112 (e.g., an electrowetting oil), which may have a thickness (e.g., depth, height) in a range of about 1 to 10 microns overlies a hydrophobic layer 108. The first fluid 112 is partitioned by pixel walls 110 of the patterned electrowetting pixel grid.

At 512, the fabricator may dispose a second fluid over the first fluid. As discussed above, a second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree.

At 514, the fabricator may place color filters and black matrix above the pixel walls and the first fluid and the second fluid. As discussed above, the color filters may include red, green, blue, white (e.g., clear) or some other colored filters. In some configurations, a black matrix material is integrated within the same layer as the color filters.

At 516, the fabricator may place a light guide that includes the light steering structures. As discussed above, the light guide can be fabricated to include the light steering structures 150 directly within the light guide. As such, a cost savings may be realized as compared to using a separate light steering structure layer. In other examples, a separate layer from the light guide may include the light steering structures and can be placed above or below the light guide.

Figure 6:
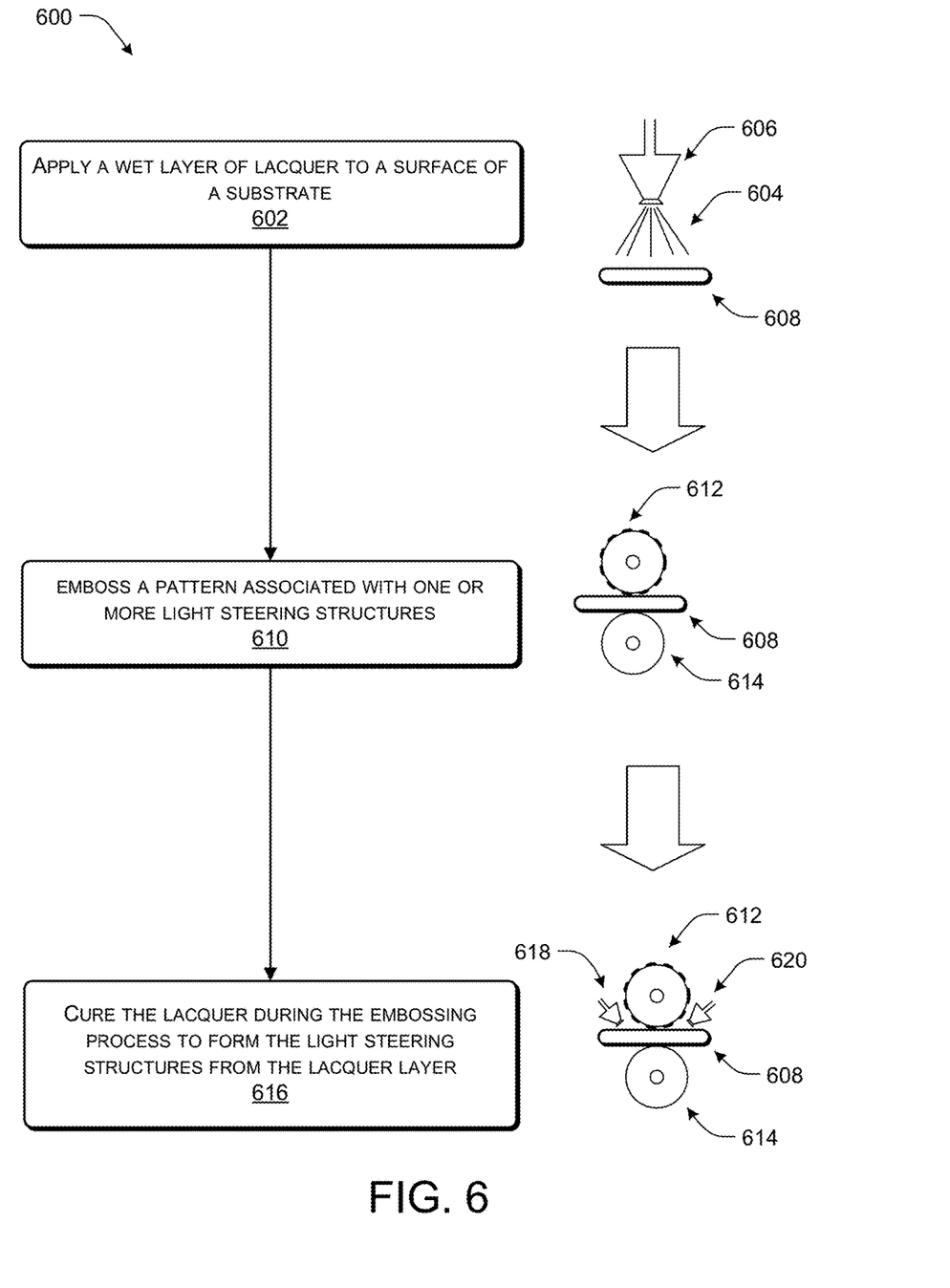
FIG. 6 is a flow diagram of a process for forming the light steering structures.

FIG. 6 illustrates an example flow diagram showing an illustrative process 600 for forming the LSSs 250. At 602, a wet layer of lacquer 604 is applied by a sprayer 606 to a surface of a substrate 608. For example, the wet layer of lacquer 604 may be applied to a top surface of a display element responsible for generating the image, a surface associated with a spacer layer responsible for maintaining a desired distance between the pixel regions of the display element and the light steering structures, a surface associated with a filter glass or layer responsible for protecting the pixels of the display element, and/or a surface associated with a protective sheet responsible for protecting other layers of the substrate 608.

In the illustrated example, the layer of lacquer 604 is applied by spraying the surface of the substrate 608. In other examples, the wet lacquer 604 may be applied by dipping, coating, or painting the surface of the substrate 608. For instance, a robotic arm may evenly apply or paint the layer of lacquer 604 micron by micron across the surface.

At 610, a pattern associated with one or more LSSs is embossed into the layer of lacquer 604 using an imprinted pattern roller 612, as well as a second roller 614. In the illustrated example, an imprinted pattern roller 612 is utilized to emboss the lacquer 604; however, in other implementations a die, mold, plate, etc. may be utilized in lieu of the roller 612. In general, the substrate 608 is pushed or forced through the opposing rollers 612 and 614, such that the imprinted pattern roller 612 leaves a resulting pattern of microstructures.

At 616, the lacquer 604 is cured while the rollers 612 and 614 are imprinting the microstructures of the LSSs into the lacquer 604. For example, one or more lamps 618 or 620 may be directed at the lacquer 604 to harden or cure the microstructures in place. For example, after the rollers 612 and 614 imprint the micro-lenses, grating elements, or other structures into the layer of lacquer 604 the lamp 618 may be utilized to cure the microstructures in place. Additionally, in some implementations, a second lamp 620 may be utilized to begin curing or hardening the lacquer 604 prior to the rollers 612 and 614 imprinting the microstructures.

Figure 7:
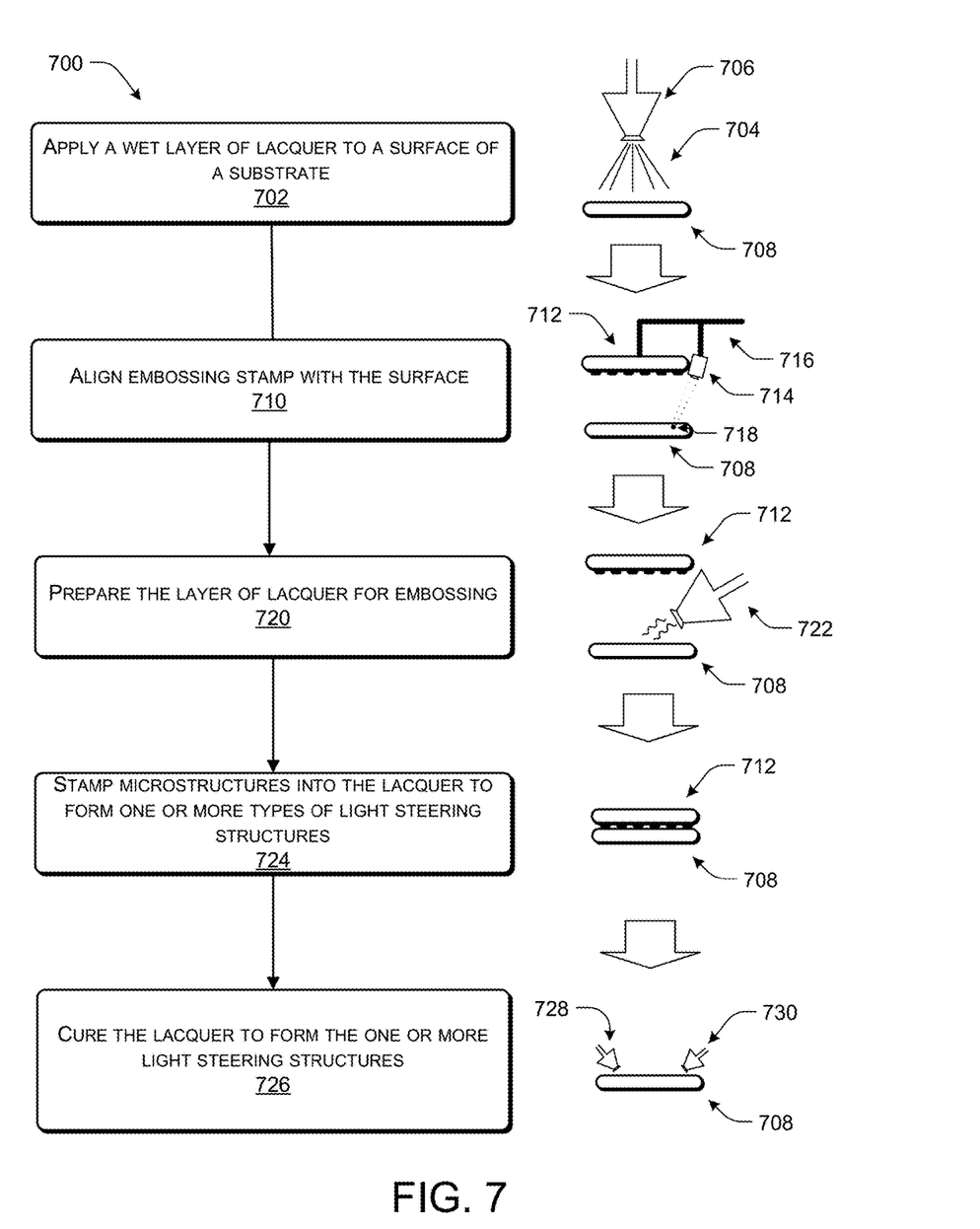
FIG. 7 is a flow diagram of another process for forming the light steering structures as part of a light guide.

FIG. 7 illustrates an example flow diagram showing an illustrative process 700 for forming a light guide 252 that includes the LSSs 250. The process 700 includes one possible example for forming one or more light steering structures out of a layer of material, such as lacquer, applied to a surface of a substrate. For instance, in some cases, the LSSs may be prefabricated as part of a plastic film that may be laminated onto a display component. However, when a lamination process is utilized, the microstructures of the LSSs may be susceptible to misalignment with regards to the pixel regions due to warping of the plastic film when heated or cured.

At 702, a wet layer of lacquer 704 is applied by a sprayer 706 to a surface of the substrate 708. For example, the wet layer of lacquer 704 may be applied to a top surface of a display element responsible for generating the image, a surface associated with a spacer layer responsible for maintaining a desired distance between the pixels of the display element and the microstructures, a surface associated with a filter glass or layer responsible for protecting the pixels of the display element, and/or a surface associated with a protective sheet responsible for protecting other layers of the substrate 708.

In the illustrated example, the layer of lacquer 704 is applied by spraying the surface of the substrate 708. In other examples, the wet lacquer 704 may be applied by dipping, coating, or painting the surface of the substrate 708. For instance, a robotic arm may evenly apply or paint the layer of lacquer 704 micron by micron across the surface. In still other examples, the layer of lacquer 704 may be replaced with a layer of resign, thermal plastic material, epoxy, solvent curable material, and/or chemical embossing material.

At 710, the embossing stamp 712 is aligned with the substrate 708. For instance, in the illustrated example, a camera 714 is connected or coupled to the stamp 712 via, for instance, a mechanical arm 716. The camera 714 may be configured to locate one or more marks, generally indicated by 718, on the display component 708 and to cause the mechanical arm 716 to adjust the positioning of the stamp 712 based on the detected location of the mark 718. In some specific examples, the mark 718 detected by the camera 714 or other optical device may be the pixels of the display component, a center of the pixels, one or more particular of the pixels (e.g., the corner pixels or a center pixel) of a display, etc. In yet other examples, identifying the mark 718 and adjusting the position of the stamp 712 may include identifying by the camera 714 may include detecting one or more edges of the substrate.

In the illustrated example, a single camera 714 is shown. However, in other examples, multiple cameras may be used in place of the camera 714. In some cases, each of the multiple cameras may be configured to identify particular pixels of a display component or particular marks 718 associated with the display component. Additionally, in the illustrated example, the camera 714 is shown connected to the stamp 712 via the mechanical arm 716. However, in some implementations, the camera 714 may be incorporated into the stamp 712 to further improve the alignment between the pixel walls, pixel regions and the microstructures.

At 720, the layer of lacquer 704 (or other material) is prepared for embossing or stamping. For example, depending on the material selected, additional processing or treatment of materials may be performed before forming the LSSs. Thus, in the illustrated example, the material is shown as being heated or treated with a chemical or solvent by sprayer 722 in order to allow the material to be embossed or stamped. In other examples, a machine (not shown) may trace, based at least in part on the optical alignment, a pattern associated with the microstructures while applying a chemical or solvent.

At 724, a pattern associated with one or more types of LSSs is embossed into the layer of lacquer 704 using a stamp 712. In the illustrated example, the stamp 712 is utilized to emboss the lacquer 704. In other implementations, a die, mold, roller, etc. may be utilized in lieu of the stamp 712. Additionally, in other examples, the stamp 712 may be a machine or device configured to trace a pattern associated with the microstructures over the layer of lacquer 708 and apply a chemical or solvent to the layer of lacquer 708 to form the LSSs.

At 726, the lacquer 704 is cured to fix the microstructures in place. For example, one or more lamps 728 or 730 may be directed at the lacquer 704 to harden or cure the microstructures. For example, after the stamp 712 imprints the microstructures into the layer of lacquer 704 the lamps 728 and 730 may be directed at the lacquer to cure the lenticular lenses or structures in place.

FIGS. 6 and 7 provide examples for forming LSSs. However, other implementations for forming LSSs may be utilized. For example, the LSSs may be built in place using 3D printing or other process. In other examples, the LSSs may be formed by forming a layer of thermal plastic over the display stack and applying heat, solvents, or other chemical applying in a defined pattern to remove portion of the thermal plastic that are unwanted. In still other examples, the LSSs may be formed by applying a wet layer of material over a substrate. Positive and/or negative charges may be applied to cause the particles of the wet layer to move or arrange into desired pattern to form the microstructures. The wet layer may be heated or cured while the charges maintain the material in the desired pattern.

Figure 8:
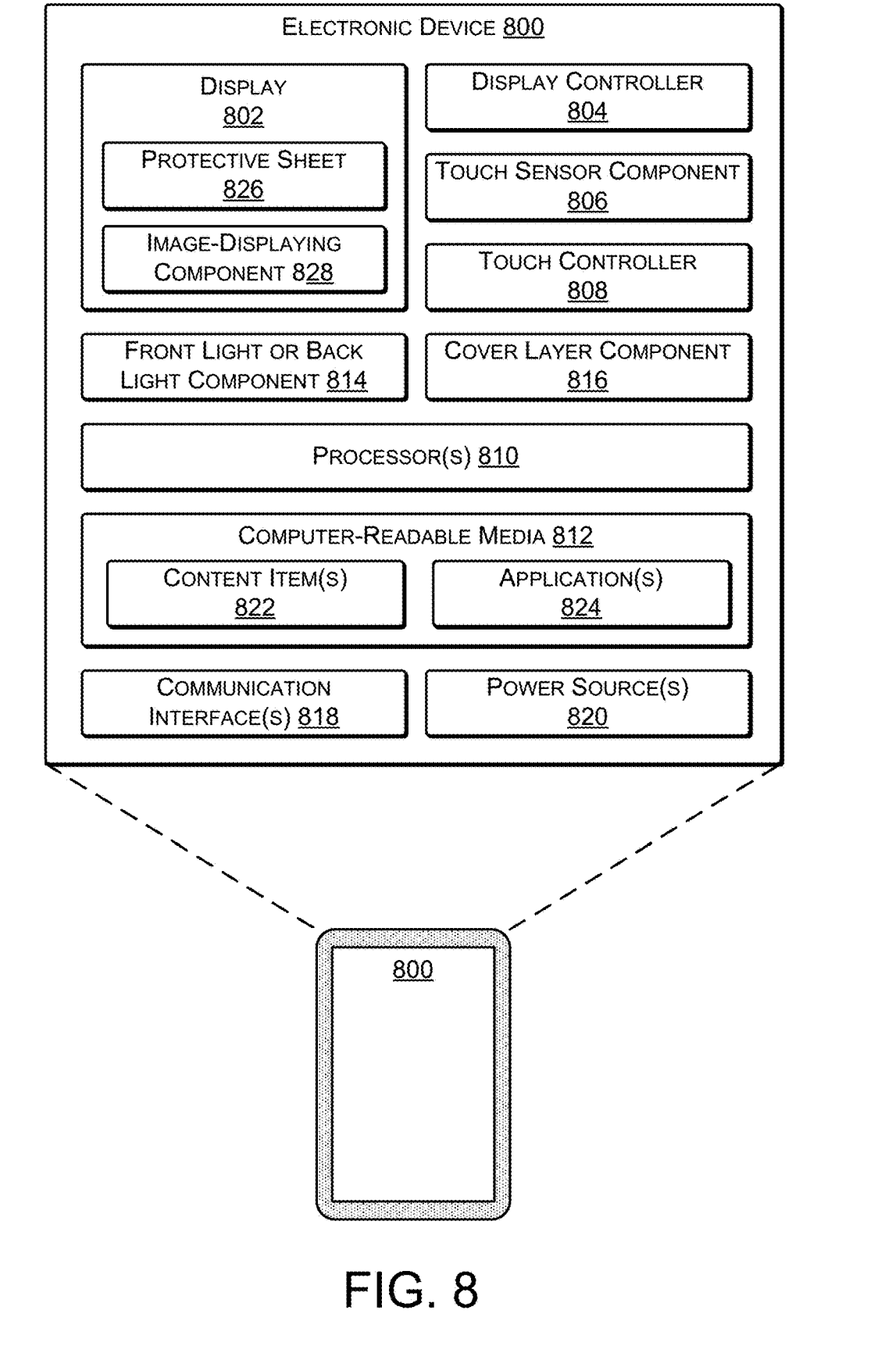
FIG. 8 illustrates an example electronic device that may incorporate a display device, according to some examples.

FIG. 8 illustrates an example electronic device 800 that may incorporate any of the display devices discussed above. The device 800 may comprise any type of electronic device having a display. For instance, the device 800 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 800 may be a non-mobile electronic device (e.g., a computer display, a television, etc.). In addition, while FIG. 8 illustrates several example components of the electronic device 800, it is to be appreciated that the device 800 may also include other conventional components, such as an operating system, system busses, input/output components, and the like. Further, in other examples, such as in the case of a television or computer monitor, the electronic device 800 may only include a subset of the components illustrated.

Regardless of the specific implementation of the electronic device 800, the device 800 includes a display 802 and a corresponding display controller 804. The display 802 may represent a reflective or transmissive display in some instances.

In an implementation, the display comprises an electrowetting display that employs an applied voltage to change the surface tension of a fluid in relation to a surface. For example, such an electrowetting display may include the array of pixels illustrated in FIG. 4, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays may be suitable for applications such as displaying video content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples are described in the environment of a reflective display, in other examples, the display 802 may represent a backlit display, examples of which are mentioned above.

In addition to including the display 802, FIG. 8 illustrates that some examples of the device 800 may include a touch sensor component 806 and a touch controller 808. In some instances, at least one touch sensor component 806 resides with, or is stacked on, the display 802 to form a touch-sensitive display. Thus, the display 802 may be capable of both accepting user touch input and rendering content in response to or corresponding to the touch input. As several examples, the touch sensor component 806 may comprise a capacitive touch sensor, a force sensitive resistance (FSR), an interpolating force sensitive resistance (IFSR) sensor, or any other type of touch sensor. In some instances, the touch sensor component 806 is capable of detecting touches as well as determining an amount of pressure or force of these touches.

FIG. 8 further illustrates that the electronic device 800 may include one or more processors 810 and one or more computer-readable media 812, as well as a front light component 814 (which may alternatively be a backlight component in the case of a backlit display) for lighting the display 802, a cover layer component 816, such as a cover glass or cover sheet, one or more communication interfaces 818 and one or more power sources 820. The communication interfaces 818 may support both wired and wireless connection to various networks, such as cellular networks, radio, WiFi networks, short range networks (e.g., Bluetooth®), infrared (IR), and so forth.

Depending on the configuration of the electronic device 800, the computer-readable media 812 (and other computer-readable media described throughout) is an example of computer storage media and may include volatile and non-volatile memory. Thus, the computer-readable media 812 may include, but is not limited to, RAM, ROM, EEPROM, flash memory, or other memory technology, or any other medium that may be used to store computer-readable instructions, programs, applications, media items, and/or data which may be accessed by the electronic device 800.

The computer-readable media 812 may be used to store any number of functional components that are executable on the processor 810, as well as content items 822 and applications 824. Thus, the computer-readable media 812 may include an operating system and a storage database to store one or more content items 822, such as eBooks, audio books, songs, videos, still images, and the like. The computer-readable media 812 of the electronic device 800 may also store one or more content presentation applications to render content items on the device 800. These content presentation applications may be implemented as various applications 824 depending upon the content items 822. For instance, the content presentation application may be an electronic book reader application for rending textual electronic books, an audio player for playing audio books or songs, a video player for playing video, and so forth.

In some instances, the electronic device 800 may couple to a cover (not illustrated in FIG. 8) to protect the display (and other components in the display stack or display assembly) of the device 800. In one example, the cover may include a back flap that covers a back portion of the device 800 and a front flap that covers the display 802 and the other components in the stack. The device 800 and/or the cover may include a sensor (e.g., a Hall effect sensor) to detect if the cover is open (i.e., if the front flap is not atop the display and other components). The sensor may send a signal to the front light component 814 if the cover is open and, in response, the front light component 814 may illuminate the display 802. If the cover is closed, meanwhile, the front light component 814 may receive a signal indicating that the cover has closed and, in response, the front light component 814 may turn off.

Furthermore, the amount of light emitted by the front light component 814 may vary. For instance, upon a user opening the cover, the light from the front light may gradually increase to its full illumination. In some instances, the device 800 includes an ambient light sensor (not illustrated in FIG. 8) and the amount of illumination of the front light component 814 may be based at least in part on the amount of ambient light detected by the ambient light sensor. For example, the front light component 814 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 802 may vary depending on whether the front light component 814 is on or off, or based on the amount of light provided by the front light component 814. For instance, the electronic device 800 may implement a larger default font or a greater contrast if the light is off compared to if the light is on. In some instances, the electronic device 800 maintains, if the light is on, a contrast ratio for the display that is within a certain defined percentage of the contrast ratio if the light is off.

As described above, the touch sensor component 806 may comprise a capacitive touch sensor that resides atop the display 802. In some examples, the touch sensor component 806 may be formed on or integrated with the cover layer component 816. In other examples, the touch sensor component 806 may be a separate component in the stack of the display assembly. The front light component 814 may reside atop or below the touch sensor component 806. In some instances, either the touch sensor component 806 or the front light component 814 is coupled to a top surface of a protective sheet 826 of the display 802. As one example, the front light component 814 may include a lightguide sheet including light steering structures and a light source (not illustrated in FIG. 8). The lightguide sheet may comprise a substrate (e.g., a transparent thermoplastic such as PMMA or other acrylic), a layer of lacquer and multiple grating elements formed in the layer of lacquer that function to propagate light from the light source towards the display 802, thus illuminating the display 802.

The cover layer component 816 may include a transparent substrate or sheet having an outer layer that functions to reduce at least one of glare or reflection of ambient light incident on the electronic device 800. In some instances, the cover layer component 816 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, the protective sheet 826 may include a similar UV-cured hard coating on the outer surface. The cover layer component 816 may couple to another component or to the protective sheet 826 of the display 802. The cover layer component 816 may, in some instances, also include a UV filter, a UV-absorbing dye, or the like, for protecting components lower in the stack from UV light incident on the electronic device 800. In still other examples, the cover layer component 816 may include a sheet of high-strength glass having an antiglare and/or antireflective coating.

The display 802 includes the protective sheet 826 overlying an image-displaying component 828. For example, the display 802 may be preassembled to have the protective sheet 826 as an outer surface on the upper or image-viewing side of the display 802. Accordingly, the protective sheet 826 may be integral with and may overlay the image-displaying component 828. The protective sheet 826 may be optically transparent to enable a user to view, through the protective sheet 826, an image presented on the image-displaying component 828 of the display 802.

In some examples, the protective sheet 826 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 826 may include a coating, such as the hard coating described above. For instance, the hard coating may be applied to the outer surface of the protective sheet 826 before or after assembly of the protective sheet 826 with the image-displaying component 828 of the display 802. In some examples, the hard coating may include a photoinitiator or other reactive species in its composition, such as for curing the hard coating on the protective sheet 826. Furthermore, in some examples, the protective sheet 826 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 826, thereby protecting the image-displaying component 828 from UV light.

According to some implementations herein, one or more of the components discussed above may be coupled to the display 802 using fluid optically-clear adhesive (LOCA). For example, suppose that the light guide portion of the front light component 814 is to be coupled to the display 802. The light guide may be coupled to the display 802 by placing the LOCA on the outer or upper surface of the protective sheet 826. If the LOCA reaches the corner(s) and/or at least a portion of the perimeter of protective sheet 826, UV-curing may be performed on the LOCA at the corners and/or the portion of the perimeter. Thereafter, the remaining LOCA may be UV-cured and the front light component 814 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 814. In other implementations, the LOCA may be placed near a center of the protective sheet 826, and pressed outwards towards a perimeter of the top surface of the protective sheet 826 by placing the front light component 814 on top of the LOCA. The LOCA may then be cured by directing UV light through the front light component 814. As discussed above, and as discussed additionally below, various techniques, such as surface treatment of the protective sheet, may be used to prevent discoloration of the LOCA and/or the protective sheet 826.

While FIG. 8 illustrates a few example components, the electronic device 800 may have additional features or functionality. For example, the device 800 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 800 may reside remotely from the device 800 in some implementations. In these implementations, the device 800 may utilize the communication interfaces 818 to communicate with and utilize this functionality.

As illustrated, a display device, such as an electrowetting display device, may be a transmissive, reflective or transflective display that generally includes an array of pixels (e.g., which may comprise subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and gate lines that are electrically connected to transistors (e.g., used as switches) included in each pixel. Transistors take up a relatively small fraction of the area of each pixel to allow light to efficiently pass through (or reflect from) the display pixel. Herein, a pixel may, unless otherwise specified, comprise a subpixel or pixel that includes two or more subpixels of an electrowetting display device. Such a pixel or subpixel may be the smallest light transmissive, reflective or transflective pixel of a display that is individually operable to directly control an amount of light transmission through or reflection from the pixel. For example, in some implementations, a pixel may comprise a red subpixel, a green subpixel, and a blue subpixel. In other implementations, a pixel may be a smallest component, e.g., the pixel does not include any subpixels.

Examples include, but are not limited to, reflective electrowetting displays that include a clear top support plate and a bottom support plate, which need not be transparent. The clear top support plate may comprise glass or any of a number of transparent materials and may be made of a rigid or flexible material, such as plastic (e.g., a transparent thermoplastic such as PMMA or other acrylic), quartz, semiconductors, and so on, and claimed subject matter is not limited in this respect. "Top" and "bottom", as used to identify the support plates of an electrowetting display, do not necessarily refer to a direction referenced to gravity or to a viewing side of the electrowetting display. Also, as used for sake of convenience of describing example examples, the top support plate is that through which viewing of pixels of a (reflective) electrowetting display occurs.

In some examples, a reflective electrowetting display comprises an array of pixels sandwiched between a bottom support plate and a top support plate. The bottom support plate may be opaque while the top support plate is transparent. Herein, describing a pixel or material as being "transparent" means that the pixel or material may transmit a relatively large fraction of the light incident upon it. For example, a transparent material or layer may transmit more than 50% or 80% of the light impinging on its surface, though claimed subject matter is not limited in this respect.

Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid. As discussed above, light steering structures can be included within the display to steer light away from the pixel walls.

Individual reflective electrowetting pixels may include a reflective layer on the bottom support plate of the electrowetting pixel, a transparent electrode layer adjacent to the reflective layer, and a hydrophobic fluoropolymer (AF) layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, spacers and edge seals may also be located between two support plates. Support plates may comprise any of a number of materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting pixels, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which should be similar to or the same as the refractive indices of surrounding media. Spacers are also desirably chemically inert to surrounding media.

In some examples, a display device as described may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all examples falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

It will be understood that when an element or layer is referred to as being "on", "over", or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present.

Reference throughout this specification to "one example" or "an example" may mean that a particular feature, structure, or characteristic described in connection with a particular example may be included in at least one example of claimed subject matter. Thus, appearances of the phrase "in one example" or "an example" in various places throughout this specification are not necessarily intended to refer to the same example or to any one particular example described. Furthermore, it is to be understood that particular features, structures, or characteristics described may be combined in various ways in one or more examples. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
a bottom support plate;
a top support plate positioned above the bottom support plate and substantially parallel to the bottom support plate, wherein a space between the bottom support plate and the top support plate includes a plurality of pixel regions for presenting content on the electrowetting display device;
a first pixel region adjacent to a pixel wall, the pixel wall disposed on a layer above the bottom support plate;
a first fluid disposed within the first pixel region;
a second fluid disposed above the first fluid;
a light steering structure that is located above the pixel wall, wherein a first edge of the light steering structure aligns with a first edge of the pixel wall and wherein the light steering structure extends from the first edge of the pixel wall to at least a second edge of the pixel wall that is opposite to the first edge of the pixel wall, wherein the light steering structure directs incoming light, including ambient light, away from the pixel wall and toward one or more of the first pixel region or a second pixel region; and a light guide that includes the light steering structure, wherein the light guide is placed above the second fluid.

2. The electrowetting display device of claim 1, wherein the light steering structure includes a lacquer layer, the lacquer layer having a plurality of one or more of grating elements or micro-lenses.

3. The electrowetting display device of claim 2, wherein a first one of the grating elements or micro-lenses directs a portion of the incoming light in a first direction away from the pixel wall and wherein a second one of the grating elements or micro-lenses direct a portion of the incoming light in a second direction away from the pixel wall.

4. The electrowetting display device of claim 1, further comprising a black matrix material disposed above the second fluid and the pixel wall, wherein the black matrix material extends a length from the first edge of the pixel wall to a location within the first pixel region, wherein the light steering structure is above the black matrix material and extends at least the length of the black matrix material, and wherein the light steering structure directs the incoming light away from the pixel wall and the black matrix material.

5. The electrowetting display device of claim 1, further comprising a second light steering structure, the second light steering structure adjacent to the light steering structure, wherein the second light steering structure extends from a second edge of the light steering structure, that is opposite to the first edge of the light steering structure, to a second pixel wall, wherein the second light steering structure distributes light generated by a display light across a display surface.

6. An electrowetting display device, comprising:
a bottom support plate;
a top support plate positioned above the bottom support plate and substantially parallel to the bottom support plate, wherein a space between the bottom support plate and the top support plate includes pixel regions;
a pixel wall associated with a first pixel region, wherein the pixel wall is disposed above the bottom support plate; and
a light steering structure disposed above the pixel wall, wherein the light steering structure extends from a first edge of the pixel wall to at least a second edge of the pixel wall that is opposite to the first edge of the pixel wall, and wherein the light steering structure directs light away from the pixel wall and toward one or more of the first pixel region or a second pixel region.

7. The electrowetting display device of claim 6, wherein the light steering structure includes a lacquer layer, the lacquer layer having a plurality of one or more of grating elements or micro-lenses.

8. The electrowetting display device of claim 7, wherein a first one of the grating elements or micro-lenses directs a portion of the light in a first direction away from the pixel wall and wherein a second one of the grating elements or micro-lenses directs a portion of the light in a second direction away from the pixel wall.

9. The electrowetting display device of claim 6, further comprising a light guide that includes the light steering structure.

10. The electrowetting display device of claim 9, wherein the light guide further comprises a second light steering structure, wherein the second light steering structure extends from an edge of the light steering structure toward an edge of a second pixel wall that is opposite to the first pixel wall, wherein the second light steering structure distributes light generated by a display across a display surface of the electrowetting display device.

11. The electrowetting display device of claim 6, further comprising a black matrix material disposed above the pixel wall, wherein the black matrix material extends a length from the first edge of the pixel wall to a location within the first pixel region, wherein the light steering structure is above the black matrix material and extends at least the length of the black matrix material, and wherein the light steering structure directs the light away from the pixel wall and the black matrix material.

12. The electrowetting display device of claim 6, wherein the light steering structure extends from the first edge of the pixel wall to at least the second edge of the pixel wall that is opposite to the first edge of the pixel wall.

13. The electrowetting display device of claim 6, further comprising:
a color filter disposed above at least a portion of the first pixel region; and
a black matrix material adjacent to the color filter, the black matrix material above the pixel wall, wherein the black matrix material and the color filter are located beneath the light steering structure.

14. The electrowetting display device of claim 6, wherein the pixel wall comprises a photoresist material that is at least substantially opaque.

15. The electrowetting display device of claim 6, further comprising a light guide that includes a second light steering structure to distribute light across a display of the electrowetting display device, wherein the light steering structure is located above the light guide or below the light guide.

16. The electrowetting display device of claim 6, wherein the first pixel region includes:
a pixel electrode disposed on the bottom support plate;
a hydrophobic layer portion disposed on the pixel electrode;
an electrowetting oil disposed on the hydrophobic layer portion;
a black matrix located over the pixel wall; and
an electrolyte solution at least partially surrounding the electrowetting oil, wherein the light steering structure covers the black matrix and at least a portion of the first pixel region.

* * * * *

UNITED STATES PATENT AND TRADEMARK OFFICE
CERTIFICATE OF CORRECTION

PATENT NO. : 10,234,677 B1
APPLICATION NO. : 15/084642
DATED : March 19, 2019
INVENTOR(S) : Guntaka et al.

Page 1 of 1

It is certified that error appears in the above-identified patent and that said Letters Patent is hereby corrected as shown below:

In the Claims

Column 19, Line 18, Claim 3, delete "direct a" and insert -- directs a --, therefor.

Signed and Sealed this
First Day of October, 2019

Andrei Iancu
*Director of the United States Patent and Trademark Office*